No. 721,622. PATENTED FEB. 24, 1903.
C. M. TOWNE.
MEASURING INSTRUMENT.
APPLICATION FILED JULY 8, 1901.
NO MODEL.
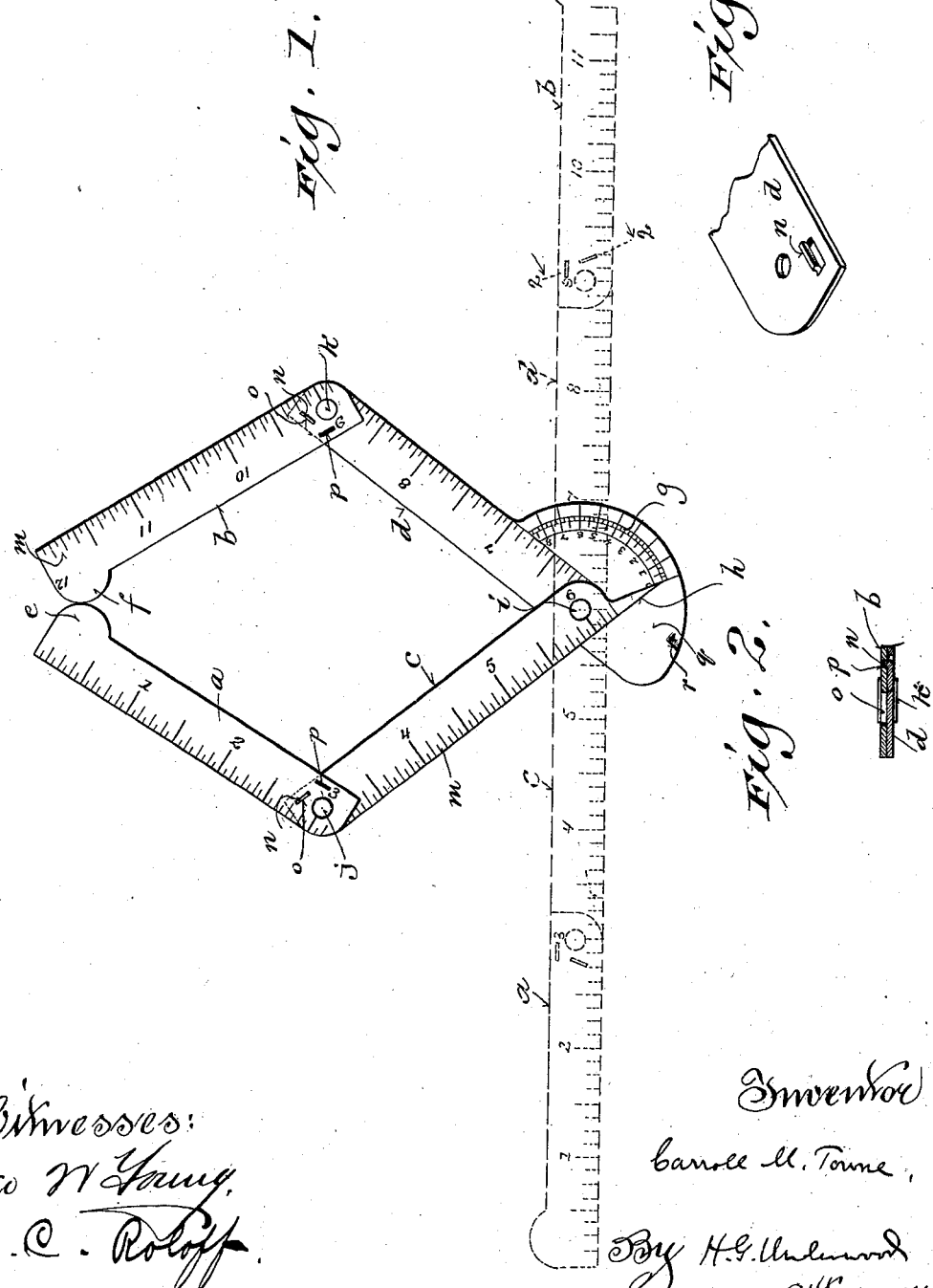

UNITED STATES PATENT OFFICE.

CARROLL M. TOWNE, OF MILWAUKEE, WISCONSIN.

MEASURING INSTRUMENT.

SPECIFICATION forming part of Letters Patent No. 721,622, dated February 24, 1903.

Application filed July 8, 1901. Serial No. 67,445. (No model.)

*To all whom it may concern:*

Be it known that I, CARROLL M. TOWNE, a citizen of the United States, and a resident of Milwaukee, in the county of Milwaukee and State of Wisconsin, have invented certain new and useful Improvements in Measuring Instruments; and I do hereby declare that the following is a full, clear, and exact description thereof.

My invention consists in a measuring instrument which combines a rule and calipers; and it consists in certain peculiarities of construction and combination of parts, as will be fully set forth hereinafter in connection with the accompanying drawings, and subsequently claimed.

In the said drawings, Figure 1 is a view of my said device, showing in full lines the same adjusted for use as calipers and in dotted lines extended to form a rule. Fig. 2 is a detail sectional view taken on the plane indicated by the line 2 2 in Fig. 1 and drawn to an enlarged scale and illustrating the joint and locking device of one of the arms, and Fig. 3 is a detail perspective view of one end of the inner part of one of said jointed arms.

Referring to the drawings, a b represent the outer parts, and c d the inner parts, of the said jointed arms. The parts a b have opposed rounded projections e f, which serve as the points of the calipers. The part d is enlarged at one end and there provided with an arc index-scale g, and the part c is formed with an index-finger h for use therewith, these parts being united by a pivot i, the jointed parts a c being similarly united by a pivot j and the jointed parts b d by a pivot k, and the said jointed parts a b c d are further marked with proper graduations suitably numbered to form a scale m. This scale may be applied to either edge of either face of the device or to both faces or to both edges of either or both of the said faces, as desired and found most convenient in any case. The inner parts c d are each provided with a tongue n, which may be conveniently struck up therefrom adjacent to the outer ends of said parts, as best shown in Fig. 3, and the adjacent or inner ends of the parts a b are each formed with two slots o p therethrough for engagement in the proper adjustment with the said tongues n, both slots being tangentially located at intervals in the line of an arc struck from the pivots j or k. Consequently when the device is to be used as a calipers the tongues n of the parts c d should be in engagement with the slot o of the parts a b, as shown in full lines in Fig. 1, and when the parts are extended in a straight line to form a rule, as indicated in dotted lines in said figure, then the tongues n will be in engagement with the slots p of said arms a b, and in either position the said jointed arms are locked against accidental displacement in the use of the tool. The arms are preferably made of thin sheet metal and held with sufficient tightness by the described pivots and locking tongues and slots for their desired use, and yet are capable of yielding readily when it is desired to change from one adjustment to the other, and thereby a light, simple, and convenient tool is provided for either linear measurement or for the measurement of diameters, as required, one advantage of my construction being that owing to the described arrangement of the slots no calculation is needed in the adjustment of the arms, as the tongues will always engage with one or the other of the adjacent slots, according as to whether a rule or calipers is required.

My device can be folded together very compactly, with the parts a b under the parts c d, and then closed toward each other, thus occupying small space, and the lower enlarged part q of the part d is preferably formed with a slight displacement of the metal at r, so as to form a stop for the edge of the part c when the device is opened out to form the described rule.

Having thus described my invention, what I claim as new, and desire to secure by Letters Patent, is—

The herein-described measuring instrument, comprising a pair of jointed arms, pivotally connected together, the outer parts of each pair of arms having opposed projections adjacent to their outer ends to serve as caliper-points, and the meeting ends of both parts of said jointed arms being provided with locking devices to automatically engage and hold the said parts in the desired adjustment, the said arms being provided with proper graduations to form a scale for linear measurement and the inner end of one of the inner parts of the jointed arms being provided with an index-finger and the corresponding end of the other inner part with an arc index-scale.

In testimony that I claim the foregoing I have hereunto set my hand, at Milwaukee, in the county of Milwaukee and State of Wisconsin, in the presence of two witnesses.

CARROLL M. TOWNE.

Witnesses:
H. G. UNDERWOOD,
B. C. ROLOFF.